(12) United States Patent
Zeng et al.

(10) Patent No.: US 11,251,574 B2
(45) Date of Patent: Feb. 15, 2022

(54) MOBILE TERMINAL

(71) Applicant: GUANGDONG OPPO MOBILE TELECOMMUNICATIONS CORP., LTD., Guangdong (CN)

(72) Inventors: Zanjian Zeng, Guangdong (CN); Zhigang Sun, Guangdong (CN); Wuchun Zeng, Guangdong (CN); Feng Xiong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 146 days.

(21) Appl. No.: 16/611,794

(22) PCT Filed: May 11, 2018

(86) PCT No.: PCT/CN2018/086572
§ 371 (c)(1),
(2) Date: Nov. 7, 2019

(87) PCT Pub. No.: WO2018/206005
PCT Pub. Date: Nov. 15, 2018

(65) Prior Publication Data
US 2021/0083439 A1    Mar. 18, 2021

(30) Foreign Application Priority Data
May 12, 2017   (CN) .......................... 201710345510.6

(51) Int. Cl.
*H04M 1/02* (2006.01)
*H01R 13/73* (2006.01)
(Continued)

(52) U.S. Cl.
CPC ............ *H01R 13/73* (2013.01); *H01M 50/20* (2021.01); *H01M 50/50* (2021.01);
(Continued)

(58) Field of Classification Search
None
See application file for complete search history.

(56) References Cited

U.S. PATENT DOCUMENTS 5,092,788 A * 3/1992 Pristupa, Jr. ........... H01R 13/22
439/225
6,424,842 B1 * 7/2002 Winstead ............ H04M 1/0262
455/557
(Continued)

FOREIGN PATENT DOCUMENTS

| CN | 201266624 Y | 7/2009 |
| CN | 202308096 U | 7/2012 |

(Continued)

OTHER PUBLICATIONS

OA for IN application 201917045806 mailed Aug. 17, 2020.
(Continued)

*Primary Examiner* — Quoc D Tran
(74) *Attorney, Agent, or Firm* — Young Basile Hanlon & MacFarlane, P.C.

(57) ABSTRACT

A mobile terminal is provided. The mobile terminal includes: a rear cover; a circuit board; a battery connector; and a fixing member including a first holder arranged on the rear cover and a second holder arranged on the circuit board. The first holder has two first elastic arms, the second holder has two second elastic arms, and each of the two second elastic arms is fastened to each of the two first elastic arms to define a receiving space for receiving the battery connector.

19 Claims, 5 Drawing Sheets

(51) Int. Cl.
  *H01M 50/50* (2021.01)
  *H01M 50/20* (2021.01)
(52) U.S. Cl.
  CPC ....... *H04M 1/0252* (2013.01); *H04M 1/0262* (2013.01); *H04M 1/0277* (2013.01)

(56) References Cited

U.S. PATENT DOCUMENTS

| | | | | |
|---|---|---|---|---|
| 9,502,844 | B2* | 11/2016 | Chen | H01R 24/76 |
| 9,620,882 | B2* | 4/2017 | Chen | H01R 13/2428 |
| 2002/0049000 | A1* | 4/2002 | Tanaka | H01R 12/7088 |
| | | | | 439/660 |
| 2004/0209157 | A1 | 10/2004 | Yamamoto | |
| 2009/0247004 | A1* | 10/2009 | Lou | H01R 13/2442 |
| | | | | 439/500 |
| 2010/0013432 | A1* | 1/2010 | Toya | H02J 7/045 |
| | | | | 320/108 |
| 2012/0155051 | A1* | 6/2012 | Cheng | G06F 1/1656 |
| | | | | 361/807 |
| 2015/0116957 | A1* | 4/2015 | Chuang | G06F 1/1635 |
| | | | | 361/748 |
| 2015/0200485 | A1* | 7/2015 | Yu | H01R 13/521 |
| | | | | 439/521 |
| 2016/0226206 | A1 | 8/2016 | Chen et al. | |
| 2018/0351141 | A1* | 12/2018 | Hayahi | H01M 50/209 |

FOREIGN PATENT DOCUMENTS

| | | |
|---|---|---|
| CN | 203327073 U | 12/2013 |
| CN | 105655507 A | 6/2016 |
| CN | 105810862 A | 7/2016 |
| CN | 205566385 U | 9/2016 |
| CN | 205754451 U | 11/2016 |
| CN | 107230918 A | 10/2017 |
| KR | 20130098054 A | 9/2013 |

OTHER PUBLICATIONS

European Search Report dated Jan. 8, 2020 from International Application No. PCT/CN2018/086572.
OA with English translation for CN application 201710345510.6 dated Aug. 3, 2018.
ISR with English translation for PCT application PCT/CN2018/086572 dated Aug. 1, 2018.

* cited by examiner

MOBILE TERMINAL

CROSS-REFERENCE TO RELATED APPLICATION(S)

The present application is a 371 application of International Application PCT/CN2018/086572, filed on May 11, 2018, which claims the benefit of and priority to Chinese Patent Application No. 201710345510.6, filed on May 12, 2017, the entire disclosures of both of which are incorporated herein by reference in their entireties.

TECHNICAL FIELD

The present disclosure relates to a mobile terminal.

BACKGROUND

A battery connector is one of commonly used components inside a mobile terminal device, such as a mobile phone, and the battery connector is used to realize electrical connection between a battery and a circuit board.

In the related art, generally, after the battery connector is fixed between a casing and a circuit board, the battery connector is fixed in the mobile phone by a screw. The applicant finds the following defects during assembly of the battery connector: since the screw is small, the installation is difficult and takes a long time.

SUMMARY

The present disclosure provides a mobile terminal, and a battery connector of the mobile terminal is easy to mount.

In order to solve the above technical problems, the present disclosure provides a mobile terminal including: a rear cover; a circuit board; a battery connector; and a fixing member including a first holder arranged on the rear cover and a second holder arranged on the circuit board, the first holder having two first elastic arms, the second holder having two second elastic arms, and each of the two second elastic arms being fastened to each of the two first elastic arms to define a receiving space for receiving the battery connector.

The present disclosure further provides another mobile terminal including: a rear cover; a circuit board; a fixing member including a first holder arranged on the rear cover and a second holder arranged on the circuit board, the first holder having two first elastic arms spaced apart from each other, the second holder having two second elastic arms spaced apart from each other, and each the two second elastic arms being hooked to each of the two first elastic arms; and a battery connector mounted on the circuit board and located between the two second elastic arms.

The present disclosure still further provides another mobile terminal including: a rear cover; a battery connector; a circuit board electrically coupled with the battery connector; a fixing member including a first holder arranged on the rear cover and a second holder arranged on the circuit board, the first holder having two first elastic arms, a space being defined between the two first elastic arms, the second holder having two second elastic arms, each the two second elastic arms being fastened to each of the two first elastic arms to define a receiving space for receiving the battery connector, such that installation of the battery connector is achieved by fastening the second holder to the first holder after the battery connector is placed in the receiving space.

With the mobile terminal according to the present disclosure, the first holder and the second holder are previously arranged on the first member and the second member correspondingly, such that the installation of the battery connector can be achieved only by fastening the second holder to the first holder after mounting the battery connector on the second member. Thus, the installation of the battery connector is convenient.

BRIEF DESCRIPTION OF DRAWINGS

In order to illustrate technical solutions of the present disclosure more clearly, drawings used in embodiments will be briefly described below. Obviously, the drawings in the following description only relate to some embodiments of the present disclosure, and one of ordinary skill in the art can obtain other drawings based on these drawings without any inventive effort.

DETAILED DESCRIPTION

Technical solutions in embodiments of the present disclosure will be described clearly and thoroughly with reference to the drawings of the embodiments of the present disclosure.

A mobile terminal 100 involved in the embodiments of the present disclosure may be any device having communication and storage functions, such as a tablet computer, a mobile phone, an e-reader, a remote controller, a personal computer (PC), a notebook computer, an in-vehicle device, and a network TV, a wearable device, and other smart devices having a networking function.

The present disclosure provides a mobile terminal including: a rear cover; a circuit board; a battery connector; and a fixing member including a first holder arranged on the rear cover and a second holder arranged on the circuit board, the first holder having two first elastic arms, the second holder having two second elastic arms, and each of the two second elastic arms being fastened to each of the two first elastic arms to define a receiving space for receiving the battery connector.

The present disclosure further provides another mobile terminal including: a rear cover; a circuit board; a fixing member including a first holder arranged on the rear cover and a second holder arranged on the circuit board, the first holder having two first elastic arms spaced apart from each other, the second holder having two second elastic arms spaced apart from each other, and each the two second elastic arms being hooked to each of the two first elastic arms; and a battery connector mounted on the circuit board and located between the two second elastic arms.

The present disclosure still further provides another mobile terminal including: a rear cover; a battery connector; a circuit board electrically coupled with the battery connector; a fixing member including a first holder arranged on the rear cover and a second holder arranged on the circuit board, the first holder having two first elastic arms, a space being defined between the two first elastic arms, the second holder having two second elastic arms, each the two second elastic arms being fastened to each of the two first elastic arms to define a receiving space for receiving the battery connector such that installation of the battery connector is achieved by fastening the second holder to the first holder after the battery connector is placed in the receiving space.

Figure 1:
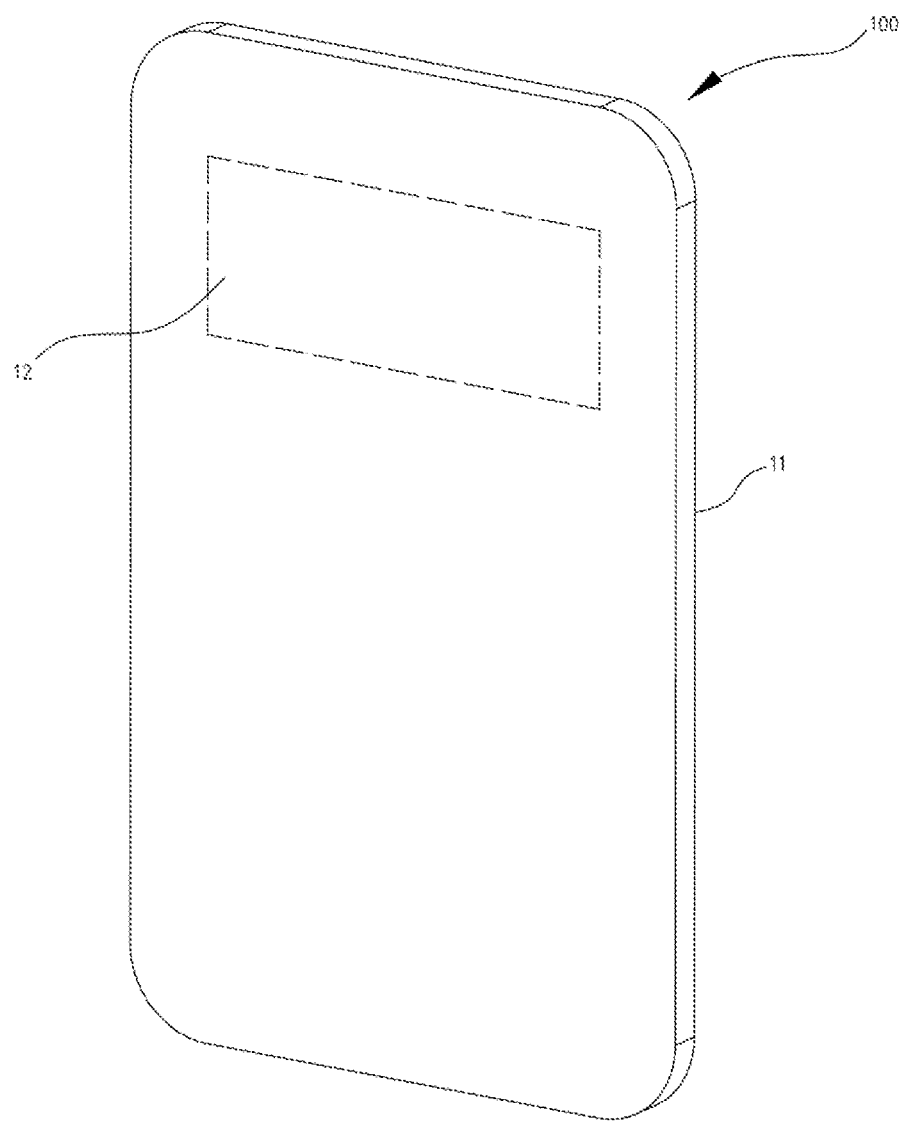
FIG. 1 illustrates a schematic view of a mobile terminal according to an embodiment of the present disclosure.
Figure 2:
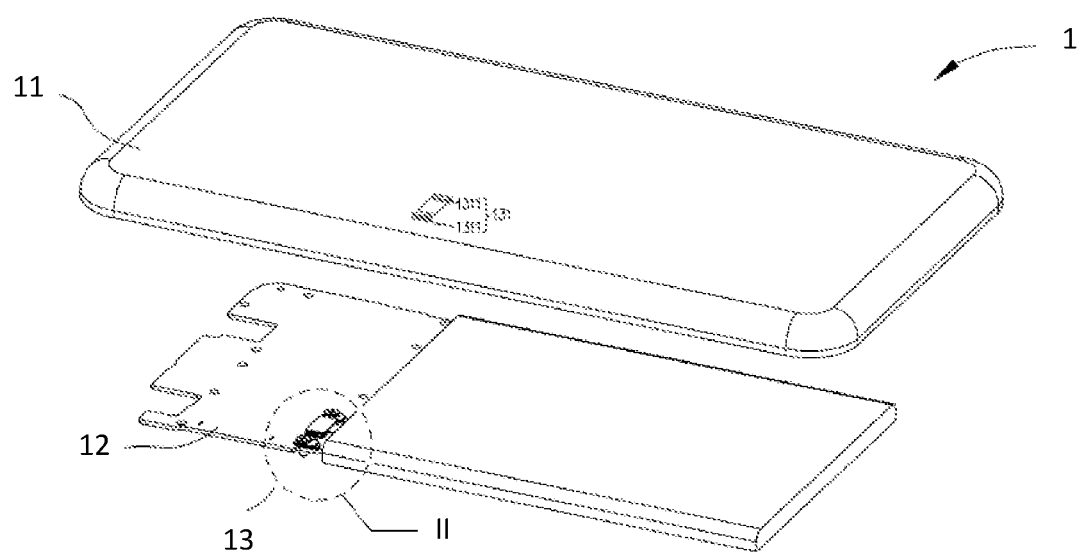
FIG. 2 illustrates a schematic view of a fixing structure for a battery connector shown in FIG. 1.
Figure 3:
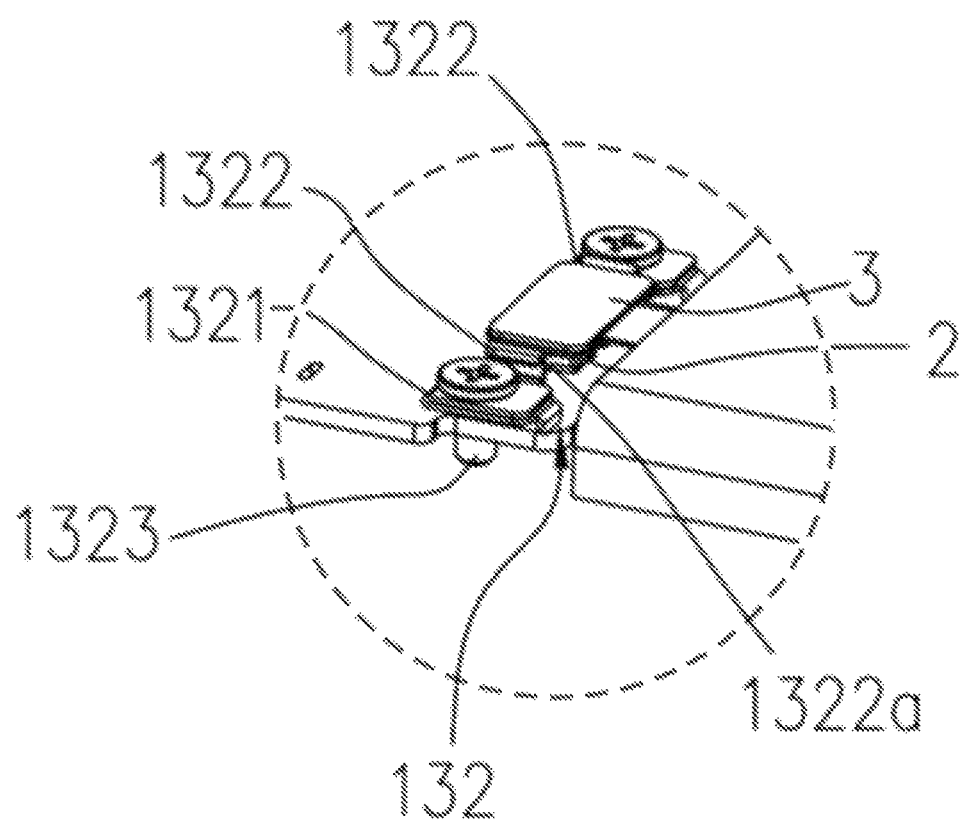
FIG. 3 is an enlarged view of part II of the fixing structure for the battery connector shown in FIG. 2.

Referring to FIGS. 1-3, the mobile terminal 100 according to the present disclosure includes a fixing structure 1 for a battery connector, and a battery connector 2 arranged in the fixing structure 1. The fixing structure 1 for the battery connector includes a first member 11, a second member 12, and a fixing member 13. The fixing member 13 includes a first holder 131 and a second holder 132 arranged to the first member 11 and the second member 12, correspondingly. With the fixing structure 1 for the battery connector and the mobile terminal 100 having the fixing structure 1, the first holder 131 and the second holder 131 are previously arranged on the first member 11 and the second member 12 correspondingly, such that the battery connector 2 is located in a receiving space 133 upon being installed to the second member 12, and the battery connector 2 can be installed only by fastening the second holder 132 to the first holder 131. In such a way, the installation of the battery connector 2 is convenient and the safety performance of the mobile terminal 100 is enhanced.

It could be understood that the first member 11 is substantially a rear cover of the mobile terminal 100, and this rear cover, together with a front case of the mobile terminal 100, forms an overall housing of the mobile terminal 100, in which the rear cover is adjacent to a battery of the mobile terminal 100. Certainly, in other embodiments, the first member 11 may be other members capable of supporting the fixing member 13.

Figure 5:
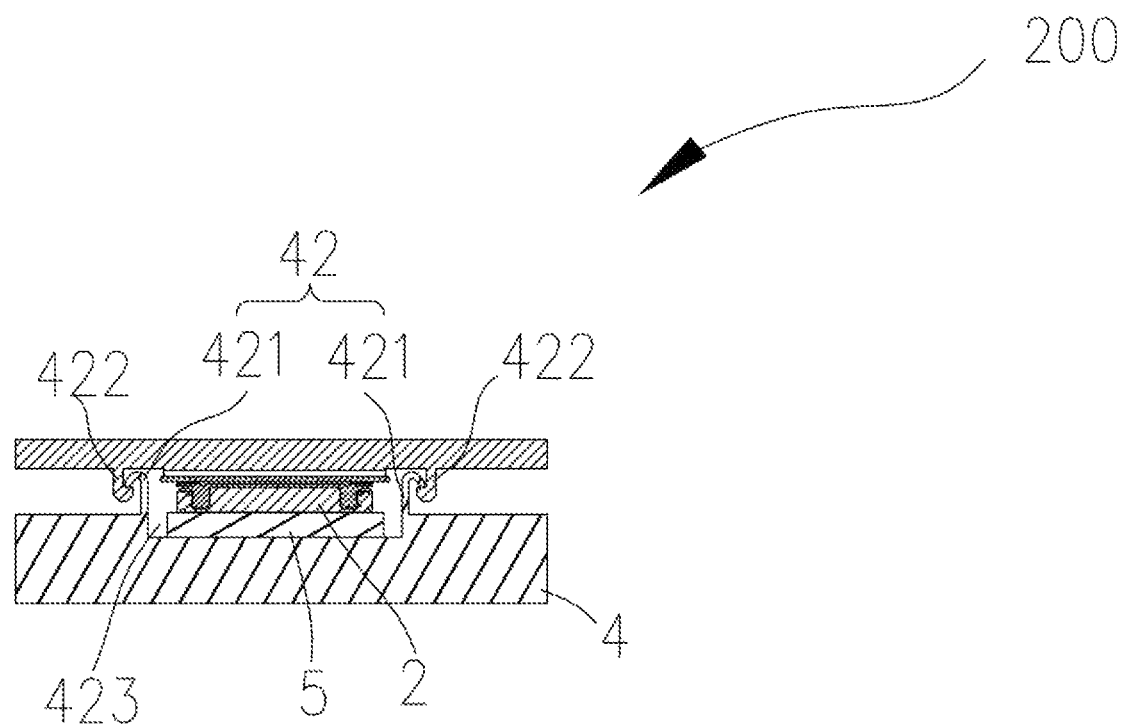
FIG. 5 illustrates a schematic view of another fixing structure for the battery connector shown in FIG. 1.

It could be understood that since the battery connector 2 needs to be electrically coupled with a circuit board in the mobile terminal 100 to realize input/output of an electric signal of the mobile terminal 100, the second member 12 is configured as the circuit board in the mobile terminal 100. By directly arranging the fixing member 13 on the rear cover of the mobile terminal 100 and the circuit board of the mobile terminal 100, the connection between the battery connector 2 and the circuit board is convenient while the fixation of the battery connector 2 is achieved, and the space utilization inside the mobile terminal 100 is improved. Certainly, in other embodiments, the second member may be other components. Referring to FIG. 5, as for a front case 4 of a mobile terminal 200, the front case 4 is provided with a second holder 42, i.e., two second elastic arms 421 at an inner surface, and the two second elastic arms 421 are integrally connected with the front case 4 and fastened to two first elastic arms 422 to define a receiving space 423 for receiving the battery connector 2. The fixing structure 1 for the battery connector further includes a circuit board 5, and the circuit board 5 can be arranged in the receiving space 423 to be connected with the battery connector 2, thereby realizing the electrical connection of the battery connector 2.

Figure 4:
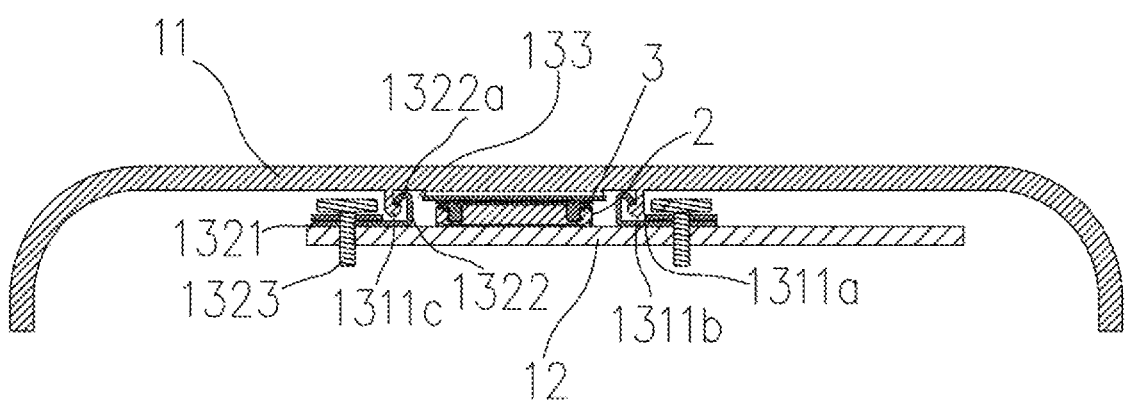
FIG. 4 illustrates a sectional view of the battery connector shown in FIG. 2.

In this embodiment, referring to FIGS. 2 and 4, the fixing member 13 includes the first holder 131 arranged on the first member 11 (the rear cover of the mobile terminal 100) and the second holder 131 arranged on the second member 12 (the circuit board inside the mobile terminal 100). Specifically, the first holder 131 has two first elastic arms 1311, spacing is defined between the two first elastic arms 1311, and the battery connector 2 of the mobile terminal 100 can be received in the spacing between the two first elastic arms 1311. The first elastic arms 1311 are made of plastics. In order to o facilitate the processing, the two first elastic arms 1311 are directly formed on an inner side of the rear cover, i.e., an inner surface adjacent to internal parts of the mobile terminal 100, during the processing of the rear cover.

Figure 6:
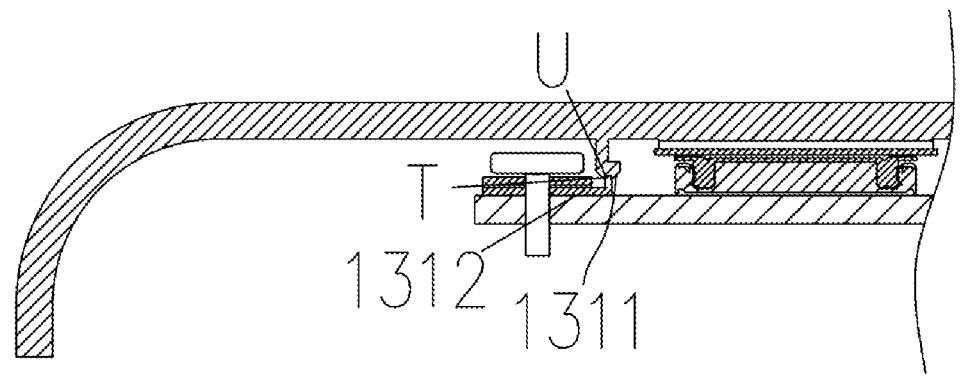
FIG. 6 illustrates a schematic view about a first holder and a second holder of a fixing structure which are connected by embedment.

It could be understood that referring to FIG. 4, each of the first elastic arms 1311 has an end bent into a first fastening portion 1311c. That is, the first elastic arm 1311 includes a first straight segment 1311a and a first bent segment 1311b connected in sequence, the first straight segment 1311a protrudes from the first member 11 and extends away from the first member 11, and the first bent segment 1311b has an end bent into a U-shape portion, i.e., the first fastening portion 1311c. Two first fastening portions 1311c are arranged facing each other. Correspondingly, an end of a second elastic arm 1322 is bent to form a second fastening portion 1322a, and the second fastening portion 1322a of one second elastic arm 1322 is fastened to the first fastening portion 1311c of one first elastic arm 1311. The second elastic arm 1322 has a structure similar to that of the first elastic arm 1311, except that second fastening portions 1322a of two second elastic arms 1322 are arranged facing away from each other in order to be fastened to the first fastening portions 1311c of the two first elastic arms 1311 correspondingly. When the fixing member 13 is fastened, only the two second elastic arms 1322 need to be pressed until the second fastening portions of the two second elastic arms 1322 are fastened to the first fastening portions 1311c of the two first elastic arms 1311, correspondingly. Not only the unique fastening portions of the first elastic arms 1311 and the second elastic arms 1322 can fasten the fixing member 13 tightly, but also the pressing-fastening manner facilitates the assembly. Certainly, in other embodiments, referring to FIG. 6, the first elastic arm 1311 can define a groove U, the second elastic arm 1322 can be provided with a protrusion T, and the second elastic arm 1322 is pressed to allow the protrusion T to be embedded into the groove U in the first elastic arm 1311.

For further improvement, referring to FIGS. 3 and 4, the second holder 132 further includes a screw 1323 connected to a connecting portion 1321 of the second member 12, and an end of the second elastic arm 1322 away from the second fastening portion is arranged to the connecting portion 1321 and extends away from the connecting portion 1321. By connecting the screw 1323 of the second holder 132 to the second member 12, the second holder 132 is easy to dismount and mount to required components. The connecting portion 1321 is rectangular and bent by a rectangular sheet, to enhance strength of the connecting portion 1321. The connecting portion 1321 is perforated in the middle thereof to allow the screw 1323 to pass, and the second elastic arm 1322 is integrally connected to the connecting portion 1321. Certainly, in other embodiments, the second holder 132 can be welded or bonded to the second member 12.

Further, referring to FIG. 4, the mobile terminal 100 further includes a battery 3 placed between the battery connector 2 and the first member 11 (i.e., the rear cover).

When the mobile terminal 100 starts to be assembled, the connecting portion 1321 of the second holder 132 is first connected to the circuit board by the screw 1323; then the battery connector 2 is inserted between the two second elastic arms 1322; the battery 3 is placed on the battery connector 2; and finally, the rear cover provided with the first holder 131 is fastened to the circuit board to fix the battery connector 2.

With the fixing structure 1 for the battery connector and the mobile terminal 100 according to the present disclosure, the first holder 131 and the second holder 131 are previously arranged on the first member 11 and the second member 12 correspondingly, such that the installation of the battery connector 2 can be achieved only by fastening the second holder 132 to the first holder 131 after mounting the battery connector 2 on the second member 12. Thus, the installation of the battery connector 2 is convenient and the safety performance of the mobile terminal 100 is enhanced.

Embodiments of the present disclosure have been described above, but it should be noted that a number of improvements and modifications can be made by one of ordinary skill in the art without departing from the principles of the present disclosure, and these improvements and modifications are also considered to fall within the protection scope of the present disclosure.

What is claimed is:

1. A mobile terminal, comprising:
   a rear cover;
   a circuit board;
   a battery connector; and
   a fixing member configured to fix the battery connector and comprising a first holder arranged on the rear cover and a second holder arranged on the circuit board, the first holder having two first elastic arms, the second holder having two second elastic arms, and each of the two second elastic arms being fastened to each of the two first elastic arms to define a receiving space for receiving the battery connector,
   wherein each of the two first elastic arms has an end bent into a first fastening portion, each of the two second elastic arms has an end bent into a second fastening portion, and the second fastening portion of each of the two second elastic arms is fastened to the first fastening portion of each of the two first elastic arms.

2. The mobile terminal according to claim 1, wherein each of the two first elastic arms comprises a first straight segment and a first bent segment connected in sequence, the first straight segment protrudes from the rear cover and extends away from the rear cover, and the first bent segment has an end bent into the first fastening portion.

3. The mobile terminal according to claim 1, wherein the first fastening portion is U-shaped.

4. The mobile terminal according to claim 1, wherein two first fastening portions of the two first elastic arms face each other.

5. The mobile terminal according to claim 1, wherein two second fastening portions of the two second elastic arms face away from each other.

6. The mobile terminal according to claim 1, wherein each of the first elastic arms defines a groove, each of the two second elastic arms is provided with a protrusion, and the protrusion of each of the two second elastic arms is embedded in the groove of each of the first elastic arms.

7. The mobile terminal according to claim 1, wherein the second holder further comprises two connecting portions extending from the two second elastic arms and connected to the circuit board by screws.

8. The mobile terminal according to claim 7, wherein the two connecting portions are rectangular and bent by rectangular sheets.

9. The mobile terminal according to claim 1, wherein the second holder is welded to the circuit board, or the second holder is bonded to the circuit board.

10. The mobile terminal according to claim 1, wherein the two first elastic arms are integral with the rear cover.

11. The mobile terminal according to claim 1, wherein the two first elastic arms are made of plastics.

12. The mobile terminal according to claim 7, wherein each of the two connecting portions is perforated in the middle thereof to allow a screw to pass.

13. The mobile terminal according to claim 7, wherein each of the two connecting portions is integral with each of the two second elastic arms.

14. The mobile terminal according to claim 7, wherein the two connecting portions are located outside the receiving space and extend away from each other.

15. The mobile terminal according to claim 1, further comprising a battery mounted on the battery connector and received in the receiving space.

16. A mobile terminal, comprising:
    a rear cover;
    a circuit board;
    a fixing member configured to fix a battery connector and comprising a first holder arranged on the rear cover and a second holder arranged on the circuit board, the first holder having two first elastic arms spaced apart from each other, the second holder having two second elastic arms spaced apart from each other, and each of the two second elastic arms being hooked to each of the two first elastic arms; and
    the battery connector mounted on the circuit board and located between the two second elastic arms,
    wherein each of the two first elastic arms has an end bent into a first fastening portion, each of the two second elastic arms has an end bent into a second fastening portion, and the second fastening portion of each of the two second elastic arms is fastened to the first fastening portion of each of the two first elastic arms.

17. The mobile terminal according to claim 16, further comprising a battery mounted between the battery connector and the rear cover.

18. The mobile terminal according to claim 16, wherein the second holder is connected to the circuit board by a screw.

19. A mobile terminal, comprising:
    a rear cover;
    a battery connector;
    a circuit board electrically coupled with the battery connector; and
    a fixing member configured to fix the battery connector and comprising a first holder arranged on the rear cover and a second holder arranged on the circuit board, the first holder having two first elastic arms, a space being defined between the two first elastic arms, the second holder having two second elastic arms, each of the two second elastic arms being fastened to each of the two first elastic arms to define a receiving space for receiving the battery connector such that installation of the battery connector is achieved by fastening the second holder to the first holder after the battery connector is placed in the receiving space,
    wherein each of the two first elastic arms has an end bent into a first fastening portion, each of the two second elastic arms has an end bent into a second fastening portion, and the second fastening portion of each of the two second elastic arms is fastened to the first fastening portion of each of the two first elastic arms.

* * * * *